US010027013B2

(12) United States Patent
Korovin et al.

(10) Patent No.: US 10,027,013 B2
(45) Date of Patent: Jul. 17, 2018

(54) COLLAR-MOUNTABLE BOBBIN ANTENNA HAVING COIL AND FERRITE SLOTS

(71) Applicant: HALLIBURTON ENERGY SERVICES, INC., Houston, TX (US)

(72) Inventors: Alexei Korovin, Houston, TX (US); Kazi Rashid, Spring, TX (US); Michael J. Levchak, Tomball, TX (US); James H. Cobb, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/513,129

(22) PCT Filed: Jan. 16, 2015

(86) PCT No.: PCT/US2015/011668
§ 371 (c)(1),
(2) Date: Mar. 21, 2017

(87) PCT Pub. No.: WO2016/114784
PCT Pub. Date: Jul. 21, 2016

(65) Prior Publication Data
US 2017/0256839 A1 Sep. 7, 2017

(51) Int. Cl.

| | |
|---|---|
| ***G01V 3/28*** | (2006.01) |
| ***H01Q 1/04*** | (2006.01) |
| ***H01Q 1/36*** | (2006.01) |
| ***H01Q 7/08*** | (2006.01) |
| ***H01Q 11/08*** | (2006.01) |
| ***H01Q 13/18*** | (2006.01) |

(52) U.S. Cl.
CPC ................ *H01Q 1/04* (2013.01); *H01Q 1/36* (2013.01); *H01Q 7/08* (2013.01); *H01Q 11/08* (2013.01); *H01Q 13/18* (2013.01)

(58) Field of Classification Search
CPC .. H01Q 1/04; H01Q 1/36; H01Q 7/08; H01Q 11/08; H01Q 13/18; G01V 3/28; G01V 3/38; G01V 3/30; G01V 3/26; E21B 47/011
USPC .......................................... 343/719; 324/339
See application file for complete search history.

(56) References Cited

U.S. PATENT DOCUMENTS 4,193,076 A 11/1980 Ito et al.
4,785,247 A 11/1988 Meador et al.
(Continued)

OTHER PUBLICATIONS

PCT International Search Report and Written Opinion, dated Sep. 25, 2015, Appl No. PCT/US2015/011668, "Collar-Mountable Bobbin Antenna Having Coil and Ferrite Slots", filed Jan. 16, 2015, 15 pgs.

(Continued)

*Primary Examiner* — Dieu H Duong
*Assistant Examiner* — Bamidele A Jegede
(74) *Attorney, Agent, or Firm* — Gilliam IP PLLC

(57) ABSTRACT

A collar-mountable antenna for transmitting and receiving signals in a downhole environment, in at least some embodiments, comprises a bobbin having an inner surface and an outer surface, each of the inner and outer surfaces defining multiple slots, conductive wire disposed within the multiple slots on the outer surface of the bobbin, and ferrite disposed within the multiple slots on the inner surface of the bobbin.

20 Claims, 12 Drawing Sheets

(56) References Cited

U.S. PATENT DOCUMENTS

| | | | | |
|---|---|---|---|---|
| 5,530,358 | A | 6/1996 | Wisler et al. | |
| 5,563,512 | A * | 10/1996 | Mumby | G01V 3/30 175/50 |
| 5,694,139 | A | 12/1997 | Saito et al. | |
| 6,010,341 | A * | 1/2000 | Matsuoka | H01R 13/518 439/364 |
| 6,930,652 | B2 * | 8/2005 | Smith | G01V 3/28 324/339 |
| 7,038,457 | B2 | 5/2006 | Chen et al. | |
| 7,436,183 | B2 | 10/2008 | Clark | |
| 7,663,372 | B2 | 2/2010 | Signorelli et al. | |
| 7,916,092 | B2 | 3/2011 | Homan et al. | |
| 8,212,567 | B2 | 7/2012 | Signorelli et al. | |
| 8,274,289 | B2 | 9/2012 | Bittar et al. | |
| 8,330,463 | B2 | 12/2012 | Blanz | |
| 8,471,562 | B2 | 6/2013 | Knizhnik | |
| 8,471,563 | B2 | 6/2013 | Wisler et al. | |
| 8,558,548 | B2 | 10/2013 | Minerbo et al. | |
| 9,407,009 | B2 | 8/2016 | Mahara | |
| 2001/0050559 | A1 * | 12/2001 | Wisler | E21B 25/00 324/377 |
| 2004/0061622 | A1 * | 4/2004 | Clark | E21B 47/122 340/854.6 |
| 2008/0224707 | A1 * | 9/2008 | Wisler | G01V 3/28 324/338 |
| 2009/0091327 | A1 * | 4/2009 | Blanz | G01V 3/18 324/333 |
| 2009/0179648 | A1 | 7/2009 | Fredette et al. | |
| 2009/0230968 | A1 * | 9/2009 | Bittar | E21B 47/024 324/338 |
| 2009/0251269 | A1 * | 10/2009 | Stelzer | G01R 33/3804 336/208 |
| 2009/0260823 | A1 * | 10/2009 | Prince-Wright | C10G 21/22 166/302 |
| 2009/0302847 | A1 * | 12/2009 | Knizhnik | G01V 3/18 324/332 |
| 2011/0316542 | A1 * | 12/2011 | Frey | G01V 3/26 324/339 |
| 2012/0025834 | A1 * | 2/2012 | Minerbo | G01V 3/28 324/339 |
| 2013/0141104 | A1 * | 6/2013 | Homan | E21B 47/102 324/339 |
| 2013/0249561 | A1 * | 9/2013 | Knizhnik | G01V 3/18 324/339 |
| 2014/0163664 | A1 * | 6/2014 | Goldsmith | A61B 17/00491 623/1.11 |
| 2014/0292340 | A1 * | 10/2014 | Yang | G01V 3/28 324/338 |
| 2015/0211307 | A1 * | 7/2015 | Minosyan | E21B 17/003 166/66 |

OTHER PUBLICATIONS

PCT International Preliminary Report on Patentability, dated Mar. 9, 2017, Appl No. PCT/US2015/011668, "Collar-Mountable Bobbin Antenna Having Coil and Ferrite Slots", filed Jan. 16, 2015, 14 pgs.

Australian First Exam Report, Application No. 2015377196, dated Jan. 19, 2018, 4 pages.

Canadian Application Serial No. 2,970,449; Canadian Office Action; dated Apr. 24, 2018, 3 pages.

* cited by examiner

COLLAR-MOUNTABLE BOBBIN ANTENNA HAVING COIL AND FERRITE SLOTS

BACKGROUND

Learning the material properties of subsurface formations may be advantageous for a variety of reasons. For instance, determining the resistivity of a formation is useful in estimating the amount and location of hydrocarbon reserves in the formation and in determining the most effective strategies for extracting such hydrocarbons. Such formation properties may be determined using drill string logging tools—e.g., transmitter and receiver antennas—that are deployed in measurement-while-drilling (MWD) applications. These tools are typically housed within slots or pockets that are machined directly into the drill string collar. Conductive wires are routed to the tools (e.g., for use in transmitter coils) via wireways housed within the drill string. Due to the space constraints inherent in drill string collars, a single wireway will typically be shared by two or more logging tools.

BRIEF DESCRIPTION OF THE DRAWINGS

Accordingly, there are disclosed in the drawings and in the following description a collar-mountable bobbin antenna having coil and ferrite slots and a dedicated wireway for each such antenna. In the drawings.

Figure 1:
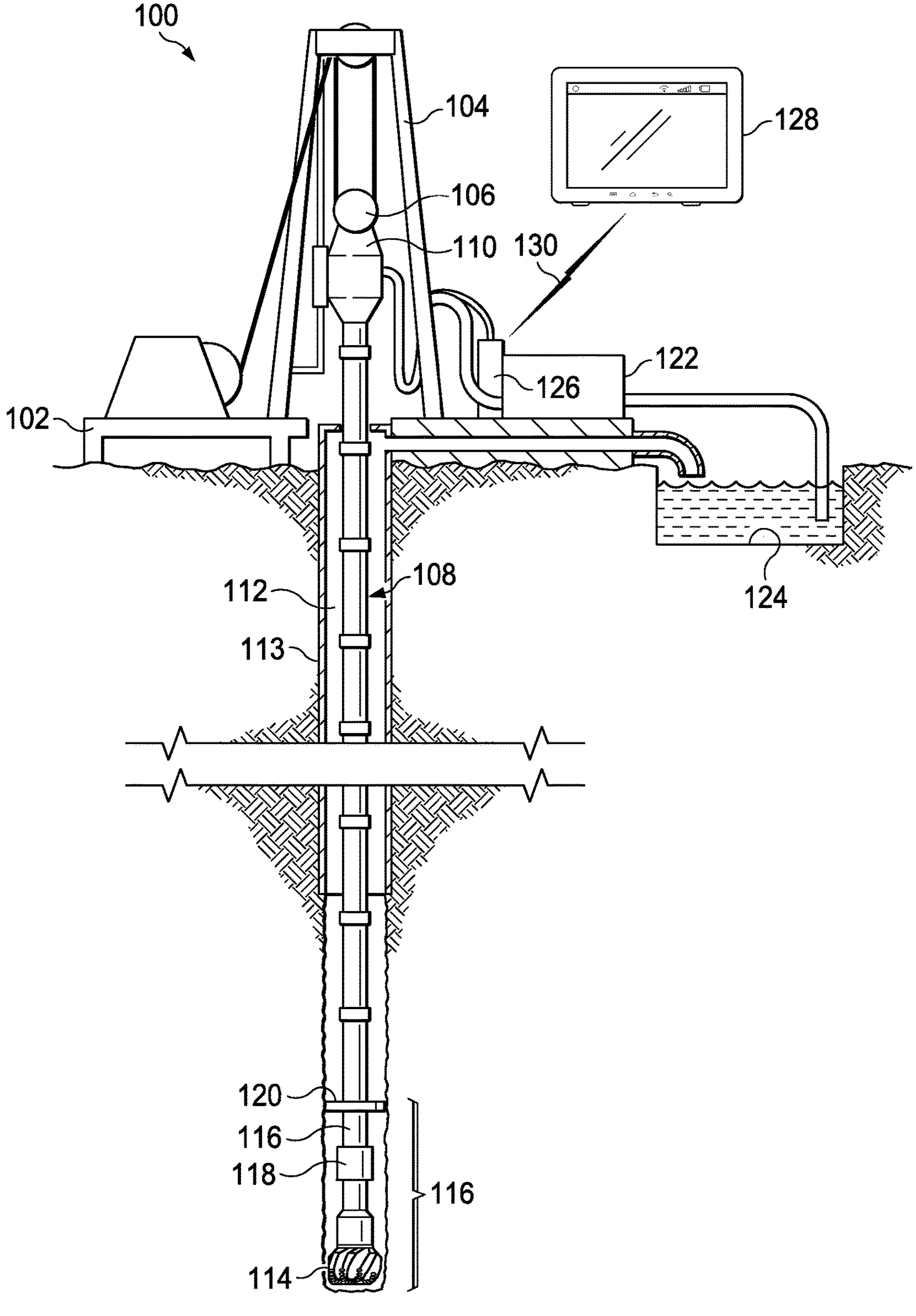
FIG. 1 is a schematic diagram of a drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

A disclosed example embodiment of a collar-mountable bobbin antenna has outer and inner surfaces on which coil and ferrite slots, respectively, are formed. The bobbin assembly is a self-contained antenna that can be mounted and removed from drill string collars with ease. In addition, the bobbin comprises a relatively inexpensive, non-conductive material (e.g., polyether ether ketone (PEEK)). Thus, compared to antennas that are machined directly into collars, the disclosed bobbin antenna provides a cost-efficient and easy-to-replace solution for downhole measurement applications. Further, because the antenna is self-contained within the bobbin and is not machined into the collar, additional space is available within the collar and, therefore, additional components may be incorporated into the collar. These additional components may include, without limitation, a dedicated wireway for supplying conductive wire to each bobbin antenna within the collar. A wireway that is "dedicated" to an antenna is a wireway that routes conductive wire to and from that antenna and no other antenna. The dedicated nature of the wireways ensures that the breach of one wireway (e.g., due to drilling fluid penetration) does not result in damage to antennas served by other wireways.

FIG. 1 is a schematic diagram of an illustrative drilling environment 100. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. As described in detail below, the bobbin antennas are mounted on the drill collars and the collars contain dedicated wireways to route conductive wire between the bobbin antennas and processing logic (e.g., a computer-controlled transmitter or receiver) that controls the antennas. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via mud pulse telemetry or any other suitable communication technique. The scope of disclosure is not limited to these particular examples of data processing units.

Figure 2:
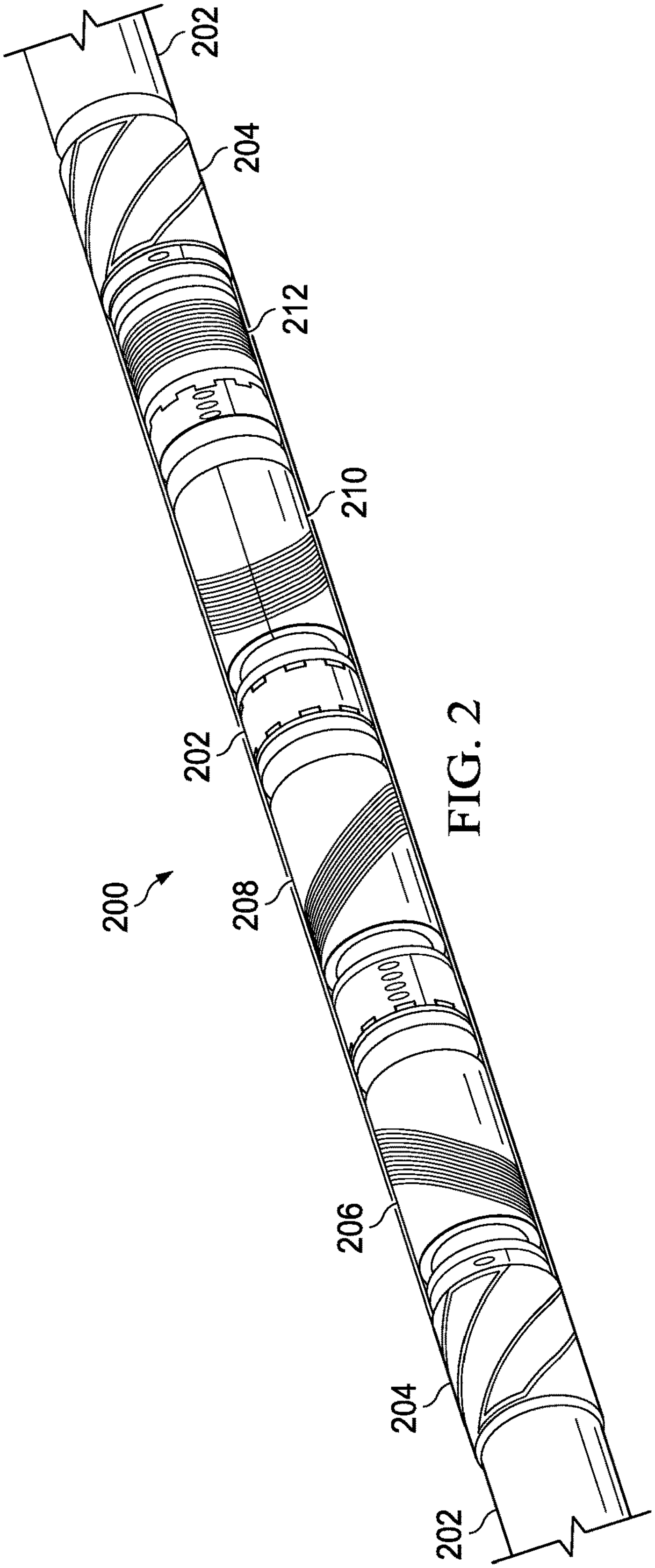
FIG. 2 is a perspective view of a measurement-while-drilling (MWD) tool.

FIG. 2 is a perspective view of a measurement-while-drilling (MWD) tool 200. The tool 200 includes a collar 202, stabilizers 204, bobbin antennas 206, 208, 210 that have tilted coil slots, and a bobbin antenna 212 that has an orthogonal coil slot. Tilted and orthogonal orientations of the coil slots are explained in detail below. The collar 202 may form part of a bottomhole assembly (BHA), such as the BHA 116 shown in FIG. 1. The stabilizers 204 have diameters larger than those of the bobbin antennas 206, 208, 210, 212 that are positioned between the stabilizers 204, thereby limiting the impact that drill string collisions with the borehole wall cause to the bobbin antennas. Although four bobbin antennas are shown in the tool 200 of FIG. 2, any suitable number of bobbin antennas may be deployed in a single tool.

Figure 3:
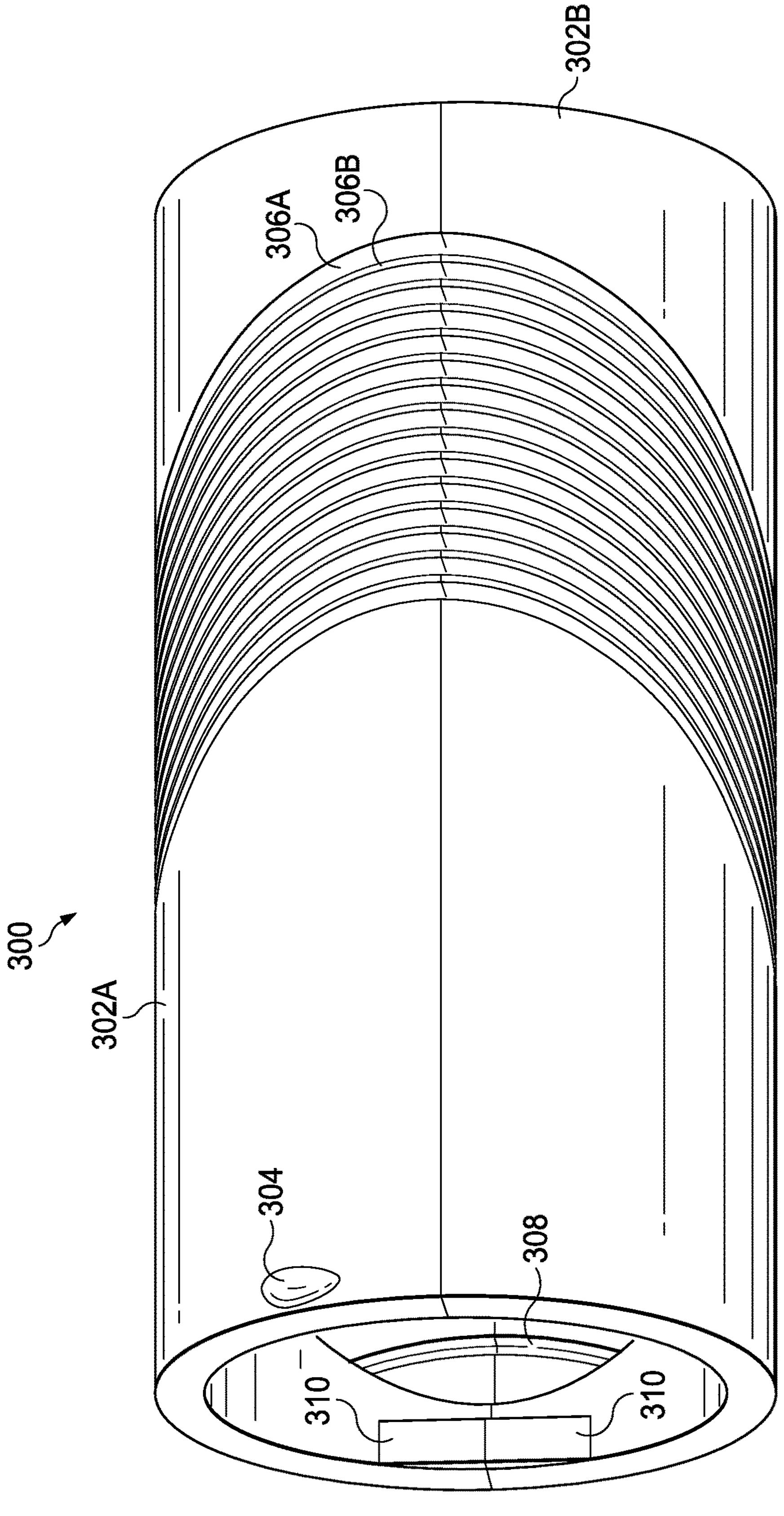
FIG. 3 is a perspective view of a bobbin antenna having tilted coil slots.

FIG. 3 is a perspective view of an illustrative bobbin antenna 300. The bobbin antenna 300 is composed of a non-conductive material, such as—without limitation—high temperature plastics, polymers and/or elastomers (e.g., PEEK). The bobbin antenna 300 is manufactured using any suitable technique, including known three-dimensional printing techniques, in which a digital design file (e.g., a computer-aided design (CAD) file) describing the bobbin antenna is used by a three-dimensional printer to manufacture the bobbin antenna. In some embodiments, the bobbin antenna 300 includes two semi-cylindrical shells 302A, 302B that couple with each other to form a cylinder, although the scope of disclosure is not limited to this particular configuration. Orifices that facilitate coupling (e.g., orifice 304) may be used to couple the shells together—for instance, using screws and/or dowels. Coil slots 306A and ridges 306B form multiple loops around the outer surface of the bobbin antenna 300, as shown. In some embodiments, the coil slots 306A are flush with the outer surface of the bobbin antenna 300 and the ridges 306B are raised above the outer surface. In other embodiments, such as those illustrated in the drawings, the ridges 306B are flush with the outer surface and the coil slots 306A are recessed below the outer surface. The precise dimensions of the coil slots 306A and ridges 306B may vary, but in at least some embodiments, the slots are 1.27 cm wide and 0.3175 cm deep, and the ridges are 0.127 cm wide. In the illustrative embodiment shown in FIG. 3, the coil slots 306A and ridges 306B are tilted with respect to the longitudinal axis of the bobbin antenna 300. Due to the elliptical nature of the coil slots 306A and ridges 306B formed on the outer surface of the bobbin antenna 300, a particular tilt angle is not specified, but such a tilt angle may be specified with respect to non-elliptical slots and ridges, such as those illustrated in and described with respect to FIG. 4, below.

The coil slots 306A house conductive wire and facilitate the looping of the conductive wire into a coil to enable the transmission and/or reception of electromagnetic signals. The ridges 306B prevent contact between the loops of the conductive wire so that the wire maintains a looped configuration appropriate for antenna applications. Conductive wire is routed to and from the coil slots 306A via one or more intra-bobbin wireways, illustrated and described below with respect to FIGS. 10-11. To facilitate communications using the conductive wire coil disposed within the ridges 306B, ferrite slots 308 are formed on the inner surface of the bobbin antenna 300. The ferrite slots 308 are illustrated and described in detail below. The bobbin antenna 300 also comprises a prominence 310 that mates with the collar on which the bobbin antenna 300 is mounted so as to fix the position of the antenna 300 relative to the collar. The prominence 310 rises from the inner surface of the bobbin antenna 300 and protrudes toward the longitudinal axis of the antenna 300. In some embodiments, a portion (e.g., half) of the prominence 310 is formed on the shell 302A and half is formed on the shell 302B, although other configurations are contemplated. In some embodiments, the prominence 310 has a maximum height of approximately 1 cm as measured from the inner surface of the bobbin antenna 300 toward the longitudinal axis of the antenna 300. In some embodiments, the prominence 310 has a width of approximately 0.5 cm and a length of approximately 4 cm. The scope of disclosure is not limited to the specific parameters of the prominence 310 recited herein.

In some embodiments, the thickness (i.e., the distance between the inner and outer surfaces) of the bobbin antenna 300 is approximately 1.27 cm, and the length of the bobbin antenna 300 is approximately 32.5 cm. These parameters may vary for different parts of an antenna and for different antenna assemblies.

Figure 4:
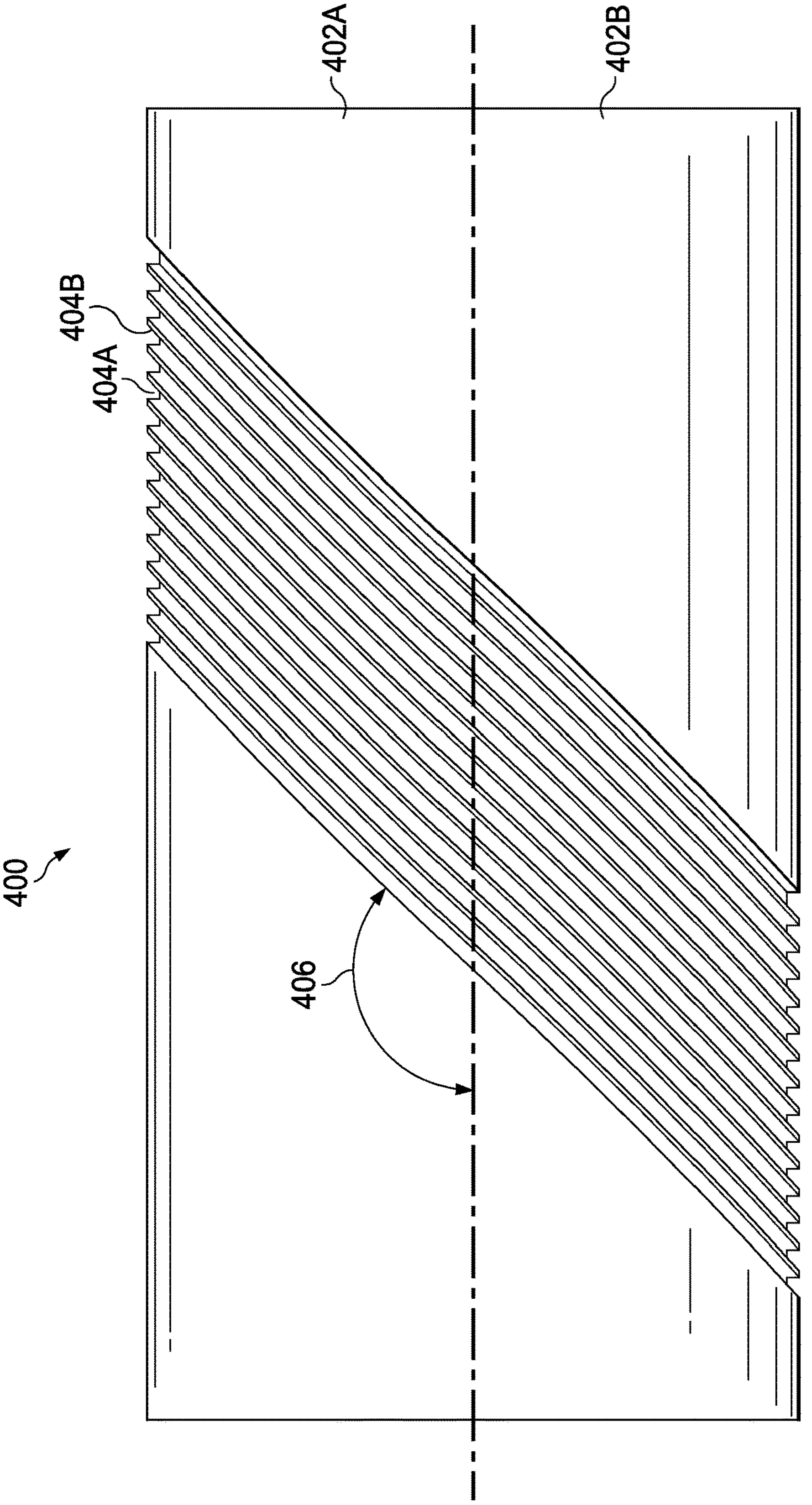
FIG. 4 is a side view of a bobbin antenna having tilted coil slots.

FIG. 4 is a side view of a bobbin antenna 400 having tilted coil slots. The bobbin antenna 400 includes mating shells 402A, 402B. Coil slots 404A and ridges 404B are formed on the outer surface of the bobbin antenna 400. As numeral 406 indicates, the coil slots 404A and ridges 404B are tilted with respect to the longitudinal axis of the bobbin antenna 400 at an approximately 120 degree angle. In other embodiments, the coil slots 404A and ridges 404B may be oriented at any other suitable angle. The tilt angle of the conductive wire (i.e., coil) positioned within the coil slots 404A dictates the direction of the electromagnetic field that is generated when current passes through the coil. Similarly, as known to those of ordinary skill in the art, the positions of the ferrite slots on the inner surface of the bobbin antenna (as described below) influence the direction of the magnetic field generated by the coil, given that the permeability of ferrite is significantly greater than that of air (i.e., ferrite generally has a high relative permeability). Accordingly, the positions of the coil and ferrite slots may be adjusted as necessary to produce an electromagnetic field with the desired characteristics.

Figure 5:
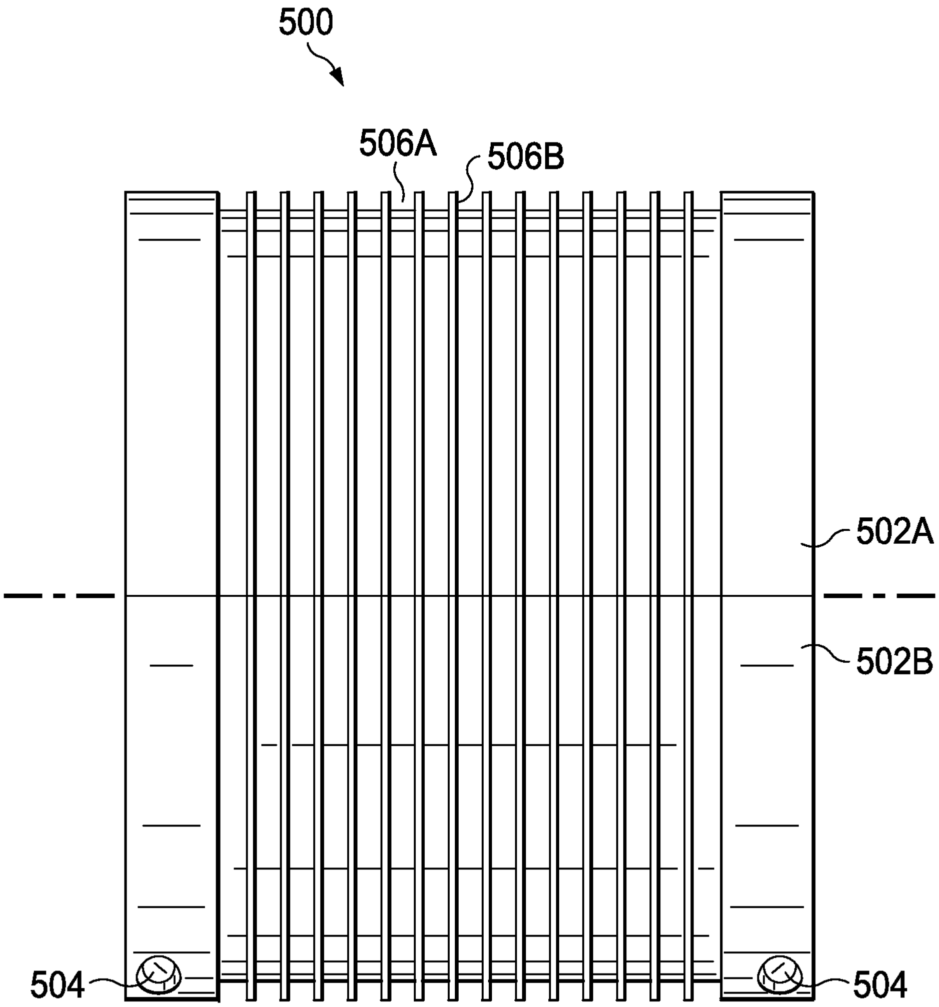
FIG. 5 is a side view of a bobbin antenna having orthogonal coil slots.

FIG. 5 is a side view of a bobbin antenna 500 having orthogonal coil slots. The bobbin antenna 500 includes mating shells 502A, 502B that are coupled to each other using screws 504. Coil slots 506A and ridges 506B are formed on the outer surface of the bobbin antenna 500. The coil slots 506A and ridges 506B are orthogonal to the longitudinal axis of the bobbin antenna 500. The principle of operation across the bobbin antennas 300, 400 and 500 (FIGS. 3-5) is the same, but using different coil slot shapes and tilt angles results in differing electromagnetic field characteristics. Accordingly, the shapes and tilt angles of the coil slots may be adjusted as desired to produce an electromagnetic field with the desired characteristics.

Figure 6A:
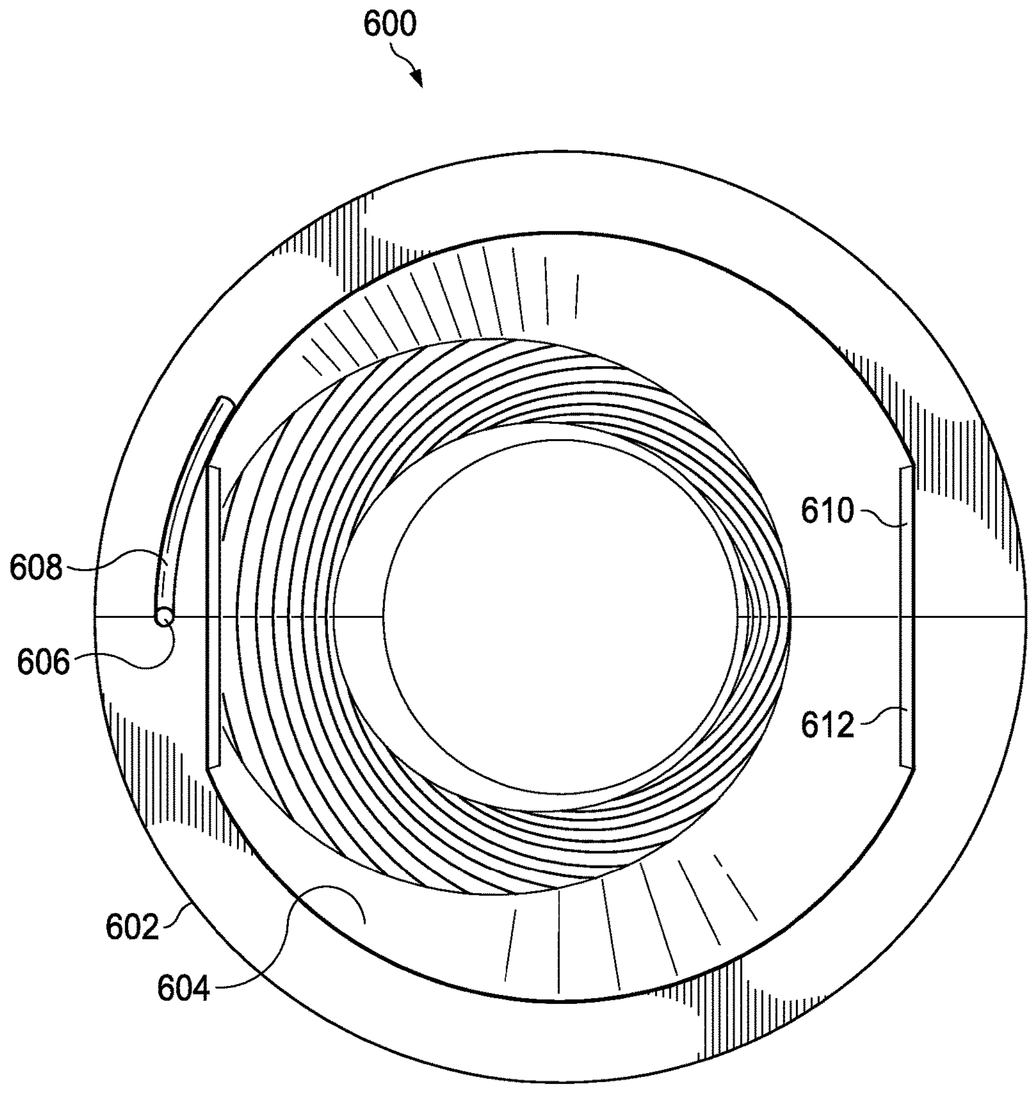
FIGS. 6A-6B are front and rear views of a bobbin antenna, respectively.
Figure 6B:
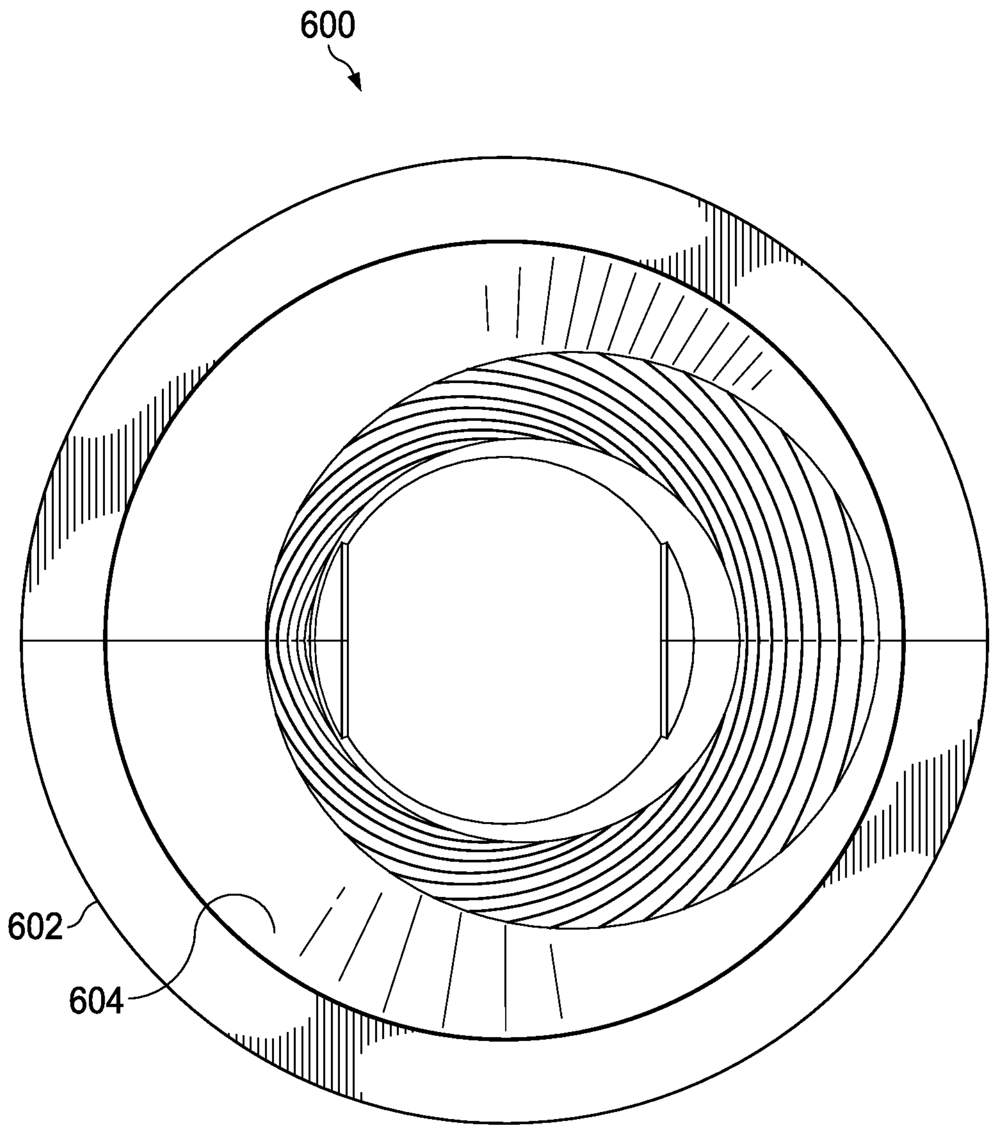

FIGS. 6A and 6B show the front and rear ends of a bobbin antenna 600, respectively. Referring to FIG. 6A, the bobbin antenna 600 has an outer surface 602 and an inner surface 604. The bobbin antenna 600 further includes an intra-bobbin wireway 606 (which serves as an outlet from the bobbin wall and is described in greater detail below) through which conductive wire is routed to and from the coil slots formed on the outer surface 602. In at least some embodiments, conductive wire passes through intra-bobbin wireway 608. From the intra-bobbin wireway 608, the conductive wire couples to another part of the collar assembly. The bobbin antenna 600 also includes a prominence 610. As explained above, the prominence 610 mates with the collar so that the bobbin antenna 600 remains fixed in place. FIG. 6B shows the rear end of the bobbin antenna 600 with outer and inner surfaces 602, 604, respectively. Although the rear end of the bobbin antenna 600 as depicted in FIG. 6B does not include a prominence or an intra-bobbin wireway, in at least some embodiments, the rear end may contain either or both of these features. For instance, in some embodiments, the front end of the bobbin antenna 600 may include the intra-bobbin wireways and prominence as shown in FIG. 6A, while the rear end includes a prominence that mates to a different portion of the collar. In other embodiments, the prominence may be positioned at the rear end in lieu of the front end. In yet other embodiments, the intra-bobbin wireway may be located at the rear end and the prominence at the front end. All such variations are contemplated and thus fall within the scope of the disclosure.

Figure 7A:
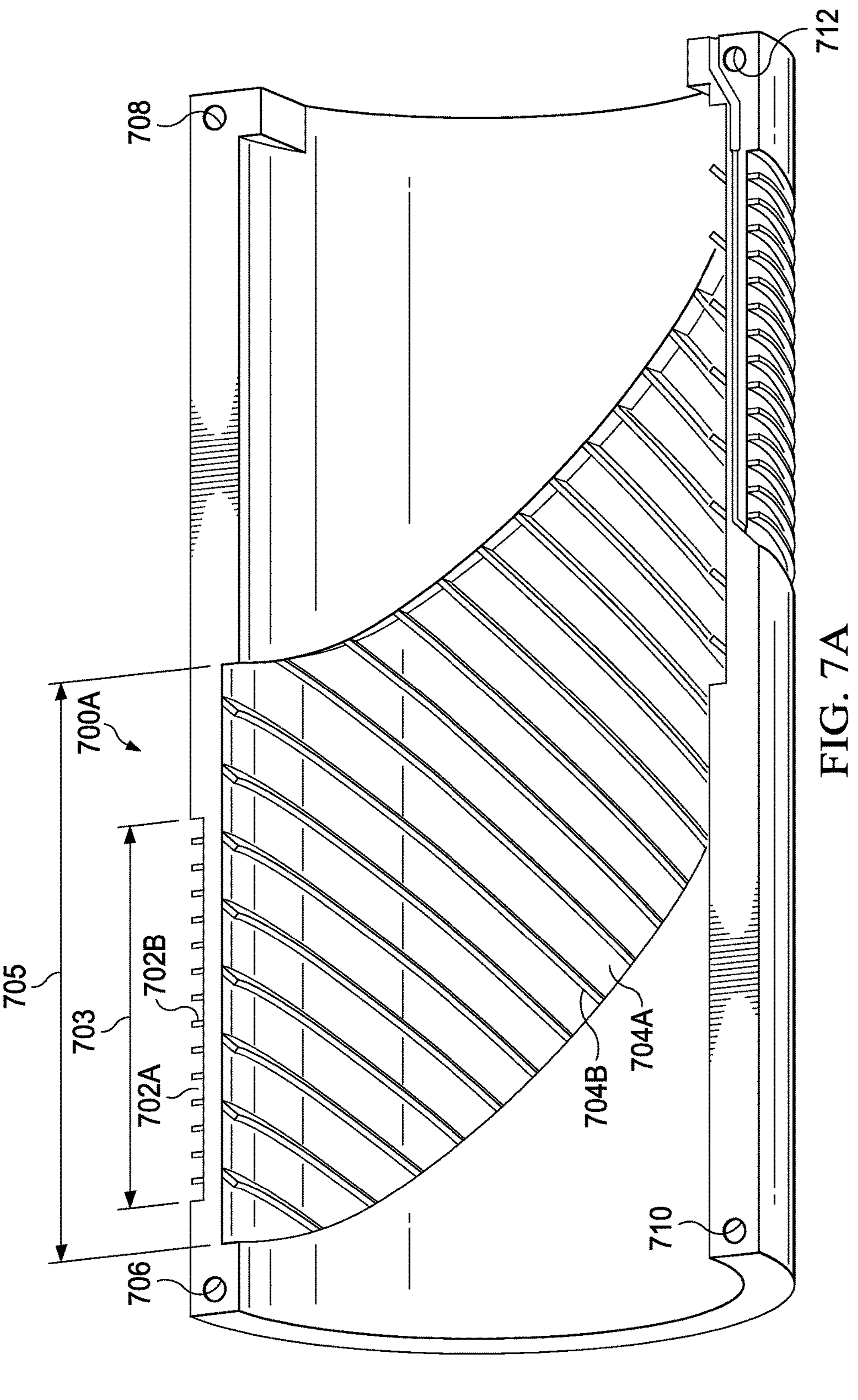
FIGS. 7A-7B are perspective views of the shells of a single bobbin.
Figure 7B:
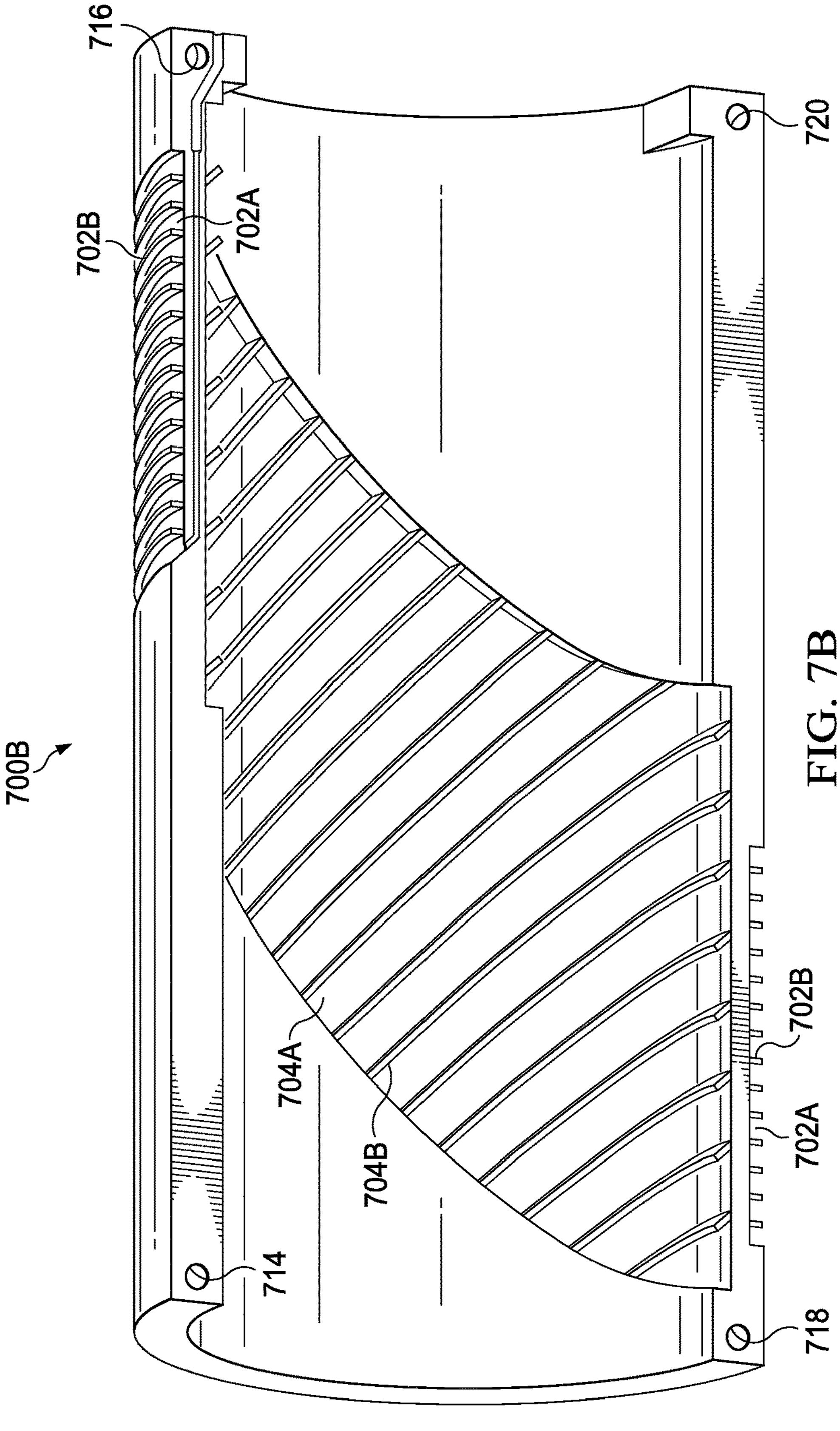

FIGS. 7A-7B are perspective views of illustrative mating shells 700A, 700B of a bobbin antenna, respectively. More particularly, FIGS. 7A-7B show the inner surfaces of the mating shells 700A, 700B. Shell 700A includes coil slots 702A and ridges 702B formed on its outer surface. Shell 700A further includes multiple ferrite slots 704A and ridges 704B formed on its inner surface, as shown. The dimensions of the ferrite slots 704A may vary based on the desired electromagnetic field, but in at least some embodiments, the ferrite slots 704A have a width of approximately 1 cm. In some embodiments, the ferrite slots 704A are flush with the inner surface of the shell 700A, while the ridges 704B extend beyond the inner surface of the shell 700A. In such embodiments, the ridges 704B have a height of approximately 2.5 mm, although other heights are contemplated. In other embodiments, the ridges 704B are flush with the inner surface of the shell 700A, while ferrite slots 704A are recessed within the inner surface of the shell 700A. In such embodiments, the ferrite slots 704A have a depth of approximately 2.5 mm, although other depths are contemplated. Any and all such variations fall within the scope of this disclosure.

In some embodiments, the ferrite slots 704A and ridges 704B occupy an area of the inner surface that opposes the area of the outer surface occupied by the coil slots 702A and ridges 702B, as shown. In some embodiments, the width 703 of the area of the outer surface occupied by the coil slots 702A and ridges 702B is narrower than the width 705 of the area of the inner surface occupied by the ferrite slots 704A and ridges 704B. The shell 700A includes dowel pin holes 706, 712 and screw holes 708, 710 that are positioned as shown so that they mate with corresponding dowels and screws that couple to the shell 700B. As explained above, in some embodiments, the ferrite slots may be arranged so that their lengths are orthogonal to the direction in which the coil slots run on the outer surface. In some embodiments, the lengths of at least some of the ferrite slots run in parallel with a longitudinal axis of the bobbin.

Referring now to FIG. 7B, the shell 700B is similar in many respects to the shell 700A. The shell 700B includes coil slots 702A and ridges 702B on its outer surface and ferrite slots 704A and ridges 704B on its inner surface. The dimensions and shapes of the slots and ridges are similar to those in shell 700A and for brevity are not repeated here. The shell 700B also includes screw holes 714, 720, both of which are similar to orifice 304 (FIG. 3) in that they accommodate a screw or equivalent fastening apparatus for the purpose of coupling with a corresponding hole (e.g., screw hole) on the shell 700A. The shell 700B also comprises dowel pin holes 716, 718, both of which accommodate a dowel or equivalent fastening apparatus for the purpose of coupling with a corresponding hole (e.g., dowel hole) on the shell 700A.

Figure 8A:
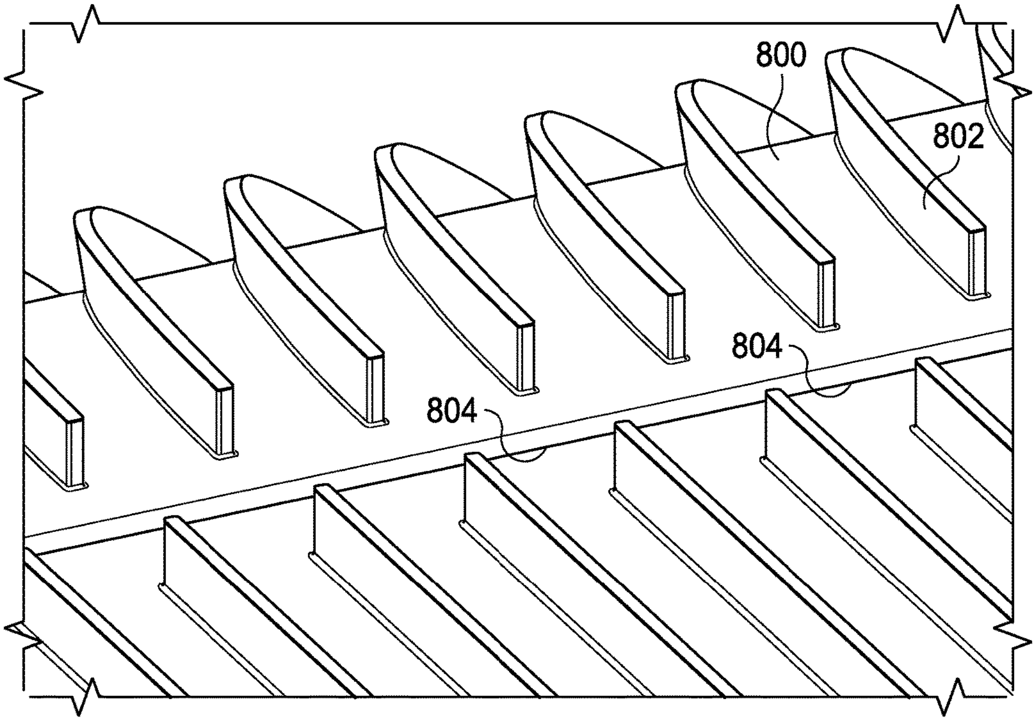
FIGS. 8A-8B are perspective and cross-sectional views, respectively, of coil slots and ridges.
Figure 8B:
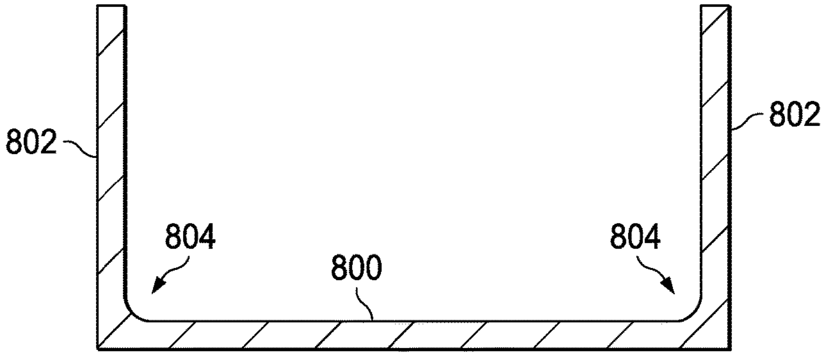

FIGS. 8A-8B are detailed perspective and cross-sectional views, respectively, of coil slots and ridges. Specifically, FIG. 8A shows a perspective view of multiple coil slots 800 and ridges 802 formed on the outer surface of a bobbin antenna. An intra-bobbin wireway 804 represents the location at which the shells of the bobbin antenna couple to each other. The intra-bobbin wireway 804 also permits the conductive wire to switch from a first coil slot 800 to a second, adjacent coil slot 800 (e.g., after having completed a full loop around the first coil slot 800). FIG. 8B shows a cross-sectional view of a single coil slot 800 and adjacent ridges 802. As shown, in at least some embodiments, the coil slot 800 and ridges 802 meet at rounded corners 804. The rounded corners 804 improve retention strength for the coil that will be disposed within the coil slot 800.

Figure 9A:
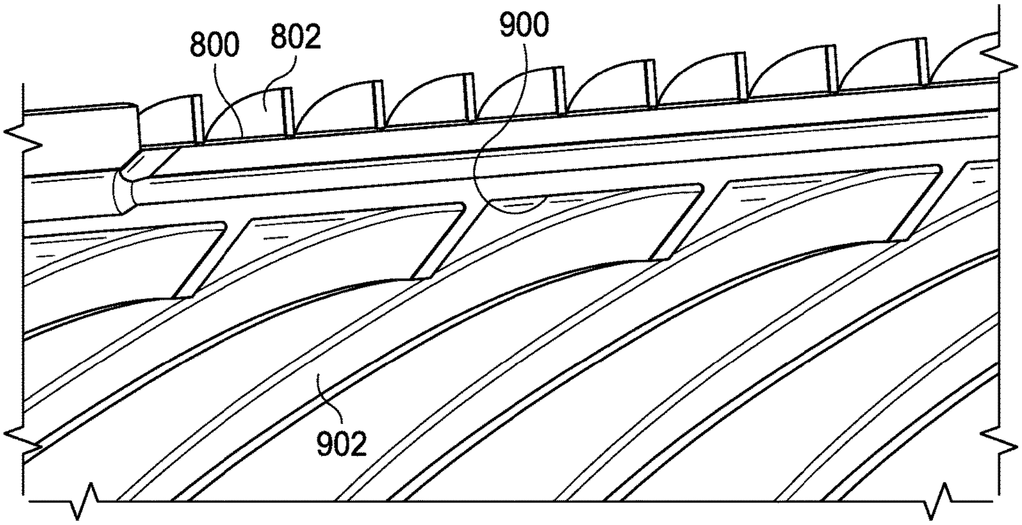
FIGS. 9A-9B are perspective and cross-sectional views, respectively, of ferrite slots and ridges.
Figure 9B:
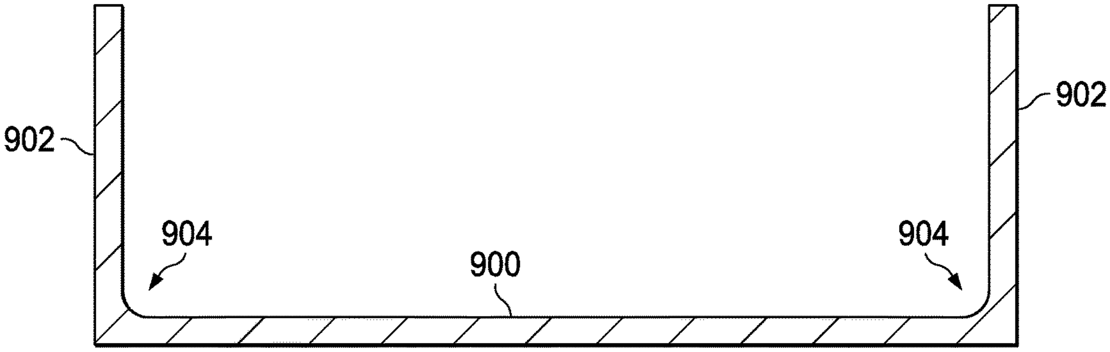

FIGS. 9A-9B are detailed perspective and cross-sectional views, respectively, of ferrite slots and ridges. Specifically, FIG. 9A shows a perspective view of a portion of a ferrite slots 900 and ridges 902, and FIG. 9B shows a cross-sectional view of the same. As with the coil slots and ridges, the ferrite slots 900 and ridges 902 meet at rounded corners 904.

Figure 10:
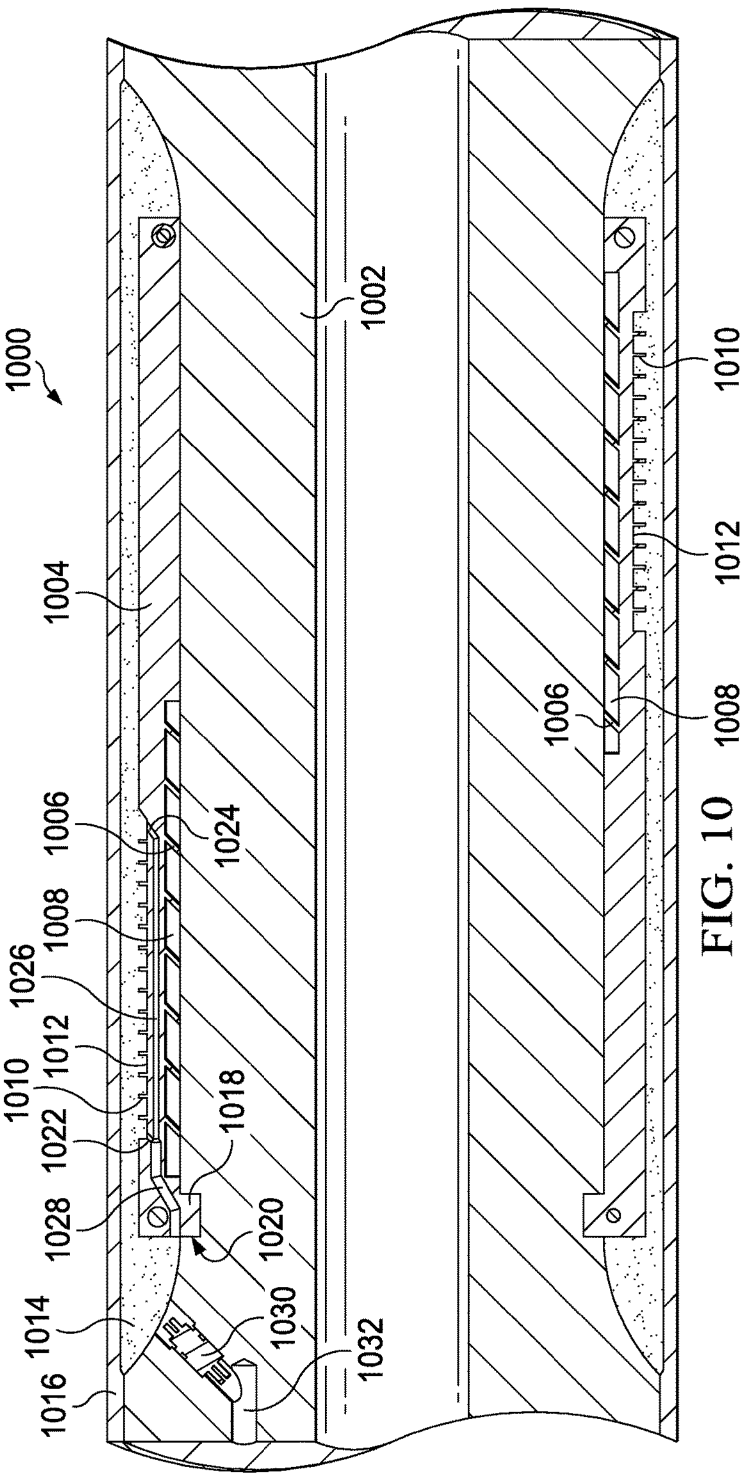
FIG. 10 is a cross-sectional view of an antenna tool assembly.

FIG. 10 is a cross-sectional view of an antenna tool assembly 1000 that includes a bobbin antenna mounted on a collar that routes conductive wire to and from the coil slots of the bobbin antenna via a dedicated collar wireway. In particular, the assembly 1000 includes a collar 1002, a bobbin antenna 1004, ferrite ridges 1006 and ferrite slots 1008, coil ridges 1010 and coil slots 1012, a fluid-resistant layer 1014 (e.g., epoxy, resin), a protective sleeve 1016, a prominence 1018 mated to a receiving slot 1020, intra-bobbin wireways 1022, 1024, 1026, and 1028, an adapter 1030, and a dedicated collar wireway 1032. As shown, the bobbin antenna 1004 is mounted on a recessed portion of the collar 1002 to permit the bobbin antenna to be protected by the fluid-resistant layer 1014 and the sleeve 1016 and so that the total diameter of the mounting (including sleeve 1016) is less than the diameter of the stabilizers 204 (FIG. 2). In this way, the bobbin antenna is protected from collisions with the borehole wall. The ferrite slots 1008 contain strips of ferrite that are coupled to the slots 1008 using a suitable epoxy or resin material. Additional epoxy or resin material may be applied as a layer between the ferrite strips and the body of the collar 1002. The coil slot 1012 contains conductive wire, although the conductive wire is not expressly illustrated in FIG. 10 so that various features (including the slots 1012 and intra-bobbin wireways 1022, 1024, 1026, 1028 and 1032) may be easily visualized. The fluid-resistant layer 1014, which is composed of a suitable epoxy or resin material and is commonly known in the art, protects the bobbin antenna 1004 and adapter 1030 from penetration by drilling fluid when the tool 1000 is positioned downhole. The protective sleeve 1016, also commonly known in the art, protects the bobbin antenna and adapter 1030 from mechanical damage but may not substantially prevent fluid intrusion. Although FIG. 10 only shows a single prominence 1018 mated to receiving slot 1020, in some embodiments, multiple such prominences and receiving slots may be used and they may be positioned as desired.

Conductive wire is routed between the coil slots 1012 and the adapter 1030 using multiple intra-bobbin wireways. Specifically, conductive wire is provided from collar wireway 1032, through the adapter 1030, through fluid-resistant layer 1014, and into intra-bobbin wireway 1028. In some embodiments, the conductive wire is then routed from the intra-bobbin wireway 1028, through the intra-bobbin wireway 1022 and to the coil slots 1012, where it is coiled around the outer surface of the bobbin antenna 1004. In such embodiments, the conductive wire is then routed back to the intra-bobbin wireway 1028 via intra-bobbin wireways 1024, 1026, after which point the wire is passed through the adapter 1030 to the collar wireway 1032. In other embodiments, the conductive wire is routed from the intra-bobbin wireway 1028 through the intra-bobbin wireways 1026 and 1024 to the coil slots 1012. The wire is coiled around the bobbin antenna 1004 and is then routed back to the intra-bobbin wireway 1028 via intra-bobbin wireway 1022. The wire then passes through the adapter 1030 to the collar wireway 1032.

Figure 11:
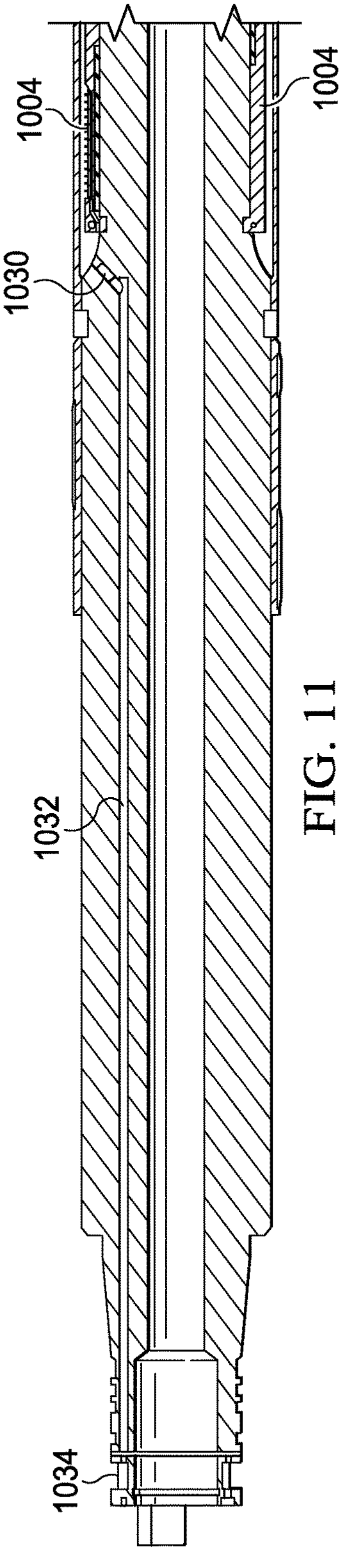
FIG. 11 is an expanded cross-sectional view of an antenna tool assembly.

FIG. 11 is an expanded cross-sectional view of the antenna tool assembly 1000. As shown, the dedicated collar wireway 1032 routes the conductive wire between the adapter 1030 and a port 1034 through which the wire couples to other components of the drill string BHA. Although a single bobbin antenna-and-dedicated-wireway combination is shown in FIG. 11, any suitable number of bobbin antennas and corresponding, dedicated collar wireways may be deployed on a single collar, as intra-collar space may permit.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The present disclosure encompasses numerous embodiments. At least some of these embodiments are directed to a collar-mountable antenna for transmitting and receiving signals in a downhole environment, comprising a bobbin having an inner surface and an outer surface, each of the inner and outer surfaces defining multiple slots; conductive wire disposed within the multiple slots on the outer surface of the bobbin; and ferrite disposed within the multiple slots on said inner surface of the bobbin. Such embodiments may be supplemented in a variety of ways, including by adding any of the following concepts in any sequence and in any combination: wherein the bobbin comprises non-conductive material; wherein a length of at least one of said slots on the inner surface is parallel with a longitudinal axis of the bobbin; wherein said conductive wire is a coil; wherein a longitudinal axis of the coil is tilted relative to a longitudinal axis of the bobbin; wherein a longitudinal axis of the coil is coincident with a longitudinal axis of the bobbin; wherein at least one of the slots formed on the inner surface has a length oriented in a direction that is perpendicular to a direction in which a length of said slot formed on the outer surface is oriented; wherein the bobbin comprises multiple intra-bobbin wireways that route the conductive wire toward and away from said slots on the outer surface, the intra-bobbin wireways disposed between said inner and outer surfaces; further comprising a ridge disposed adjacent to one of said slots on the outer surface, and wherein the ridge and the one of said slots meet at a rounded corner; and wherein said slots formed on the inner surface occupy a total area greater than that occupied by said slots on the outer surface.

Additional embodiments are directed to a system for measuring the properties of a formation, comprising: a collar; a bobbin mounted on the collar; conductive wire positioned in slots formed on an outer surface of the bobbin; ferrite positioned in slots formed on an inner surface of the bobbin; and a prominence on said inner surface of the bobbin that mates with the collar so as to maintain a position of the bobbin relative to the collar. Such embodiments may be supplemented in a variety of ways, including by adding any of the following concepts in any sequence and in any combination: wherein at least one of said slots formed on the inner surface is wider than one of said slots formed on the outer surface; wherein said slots formed on the inner surface are separated from each other by ridges, and wherein at least one of the slots formed on the inner surface meets at least one of said ridges at a rounded corner; and further comprising a ridge adjacent to one of the slots on the outer surface, wherein the ridge meets said one of the slots on the outer surface at a rounded corner.

Additional embodiments are directed to a method for manufacturing a bobbin antenna, comprising: obtaining a digital design file describing the bobbin antenna; and using a three-dimensional printer to manufacture the bobbin antenna according to the digital design file, wherein said manufactured bobbin antenna comprises opposing semi-cylindrical shells, multiple coil slots on an outer surface of the bobbin antenna, and multiple ferrite slots on an inner surface of the bobbin antenna. Such embodiments may be supplemented in a variety of ways, including by adding any of the following concepts or steps in any sequence and in any combination: wherein using the three-dimensional printer to manufacture the bobbin antenna comprises using a non-conductive material; wherein the non-conductive material is polyether ether ketone (PEEK); wherein the manufactured bobbin antenna comprises a prominence on said inner surface that projects toward a longitudinal axis of the bobbin antenna; wherein the manufactured bobbin comprises one or more intra-bobbin wireways between one of said multiple coil slots and an outlet on a surface of the bobbin antenna that is coincident with a plane orthogonal to a longitudinal axis of the bobbin antenna; and wherein the manufactured bobbin comprises multiple ridges adjacent to said multiple coil slots, and wherein the multiple ridges meet the multiple coil slots at rounded corners.

The following is claimed:

1. A collar-mountable antenna for transmitting and receiving signals in a downhole environment, comprising:

a bobbin having an inner surface and an outer surface, each of the inner and outer surfaces defining multiple slots;

conductive wire disposed within the multiple slots on the outer surface of the bobbin; and ferrite disposed within the multiple slots on said inner surface of the bobbin;

wherein said bobbin comprises opposing semi-cylindrical shells.

2. The antenna of claim 1, wherein the bobbin comprises non-conductive material.

3. The antenna of claim 1, wherein a length of at least one of said slots on the inner surface is parallel with a longitudinal axis of the bobbin.

4. The antenna of claim 1, wherein said conductive wire is a coil.

5. The antenna of claim 4, wherein a longitudinal axis of the coil is tilted relative to a longitudinal axis of the bobbin.

6. The antenna of claim 4, wherein a longitudinal axis of the coil is coincident with a longitudinal axis of the bobbin.

7. The antenna of claim 1, wherein at least one of the slots formed on the inner surface has a length oriented in a direction that is perpendicular to a direction in which a length of said slot formed on the outer surface is oriented.

8. The antenna of claim 1, wherein the bobbin comprises multiple intra-bobbin wireways that route the conductive wire toward and away from said slots on the outer surface, the intra-bobbin wireways disposed between said inner and outer surfaces.

9. The antenna of claim 1, further comprising a ridge disposed adjacent to one of said slots on the outer surface, and wherein the ridge and the one of said slots meet at a rounded corner.

10. The antenna of claim 1, wherein said slots formed on the inner surface occupy a total area greater than that occupied by said slots on the outer surface.

11. A system for measuring the properties of a formation, comprising:

a collar;

a bobbin mounted on the collar;

conductive wire positioned in slots formed on an outer surface of the bobbin;

ferrite positioned in slots formed on an inner surface of the bobbin; and a prominence on said inner surface of the bobbin that mates with the collar so as to maintain a position of the bobbin relative to the collar;

wherein said bobbin comprises opposing semi-cylindrical shells.

12. The system of claim 11, wherein at least one of said slots formed on the inner surface is wider than one of said slots formed on the outer surface.

13. The system of claim 11, wherein said slots formed on the inner surface are separated from each other by ridges, and wherein at least one of the slots formed on the inner surface meets at least one of said ridges at a rounded corner.

14. The system of claim 11, further comprising a ridge adjacent to one of the slots on the outer surface, wherein the ridge meets said one of the slots on the outer surface at a rounded corner.

15. A method for manufacturing a bobbin antenna, comprising:

obtaining a digital design file describing the bobbin antenna; and using a three-dimensional printer to manufacture the bobbin antenna according to the digital design file, wherein said manufactured bobbin antenna comprises opposing semi-cylindrical shells, multiple coil slots on an outer surface of the bobbin antenna, and multiple ferrite slots on an inner surface of the bobbin antenna.

16. The method of claim 15, wherein using the three-dimensional printer to manufacture the bobbin antenna comprises using a non-conductive material.

17. The method of claim 16, wherein the non-conductive material is polyether ether ketone (PEEK).

18. The method of claim 15, wherein the manufactured bobbin antenna comprises a prominence on said inner surface that projects toward a longitudinal axis of the bobbin antenna.

19. The method of claim 15, wherein the manufactured bobbin comprises one or more intra-bobbin wireways between one of said multiple coil slots and an outlet on a surface of the bobbin antenna that is coincident with a plane orthogonal to a longitudinal axis of the bobbin antenna.

20. The method of claim 15, wherein the manufactured bobbin comprises multiple ridges adjacent to said multiple coil slots, and wherein the multiple ridges meet the multiple coil slots at rounded corners.

* * * * *